United States Patent
Kato et al.

(10) Patent No.: US 8,518,544 B2
(45) Date of Patent: Aug. 27, 2013

(54) GLASS PLATE AND PROCESS FOR PRODUCING GLASS PLATE

(75) Inventors: Yasumasa Kato, Tokyo (JP); Akira Sugahara, Tokyo (JP)

(73) Assignee: Asahi Glass Company, Limited, Tokyo (JP)

(*) Notice: Subject to any disclaimer, the term of this patent is extended or adjusted under 35 U.S.C. 154(b) by 0 days.

(21) Appl. No.: 13/566,001

(22) Filed: Aug. 3, 2012

(65) Prior Publication Data
US 2012/0295072 A1    Nov. 22, 2012

Related U.S. Application Data

(63) Continuation of application No. PCT/JP2011/052174, filed on Feb. 2, 2011.

(30) Foreign Application Priority Data

Feb. 3, 2010   (JP) .................................. 2010-022121

(51) Int. Cl.
*B32B 17/00* (2006.01)
*C03B 25/00* (2006.01)
*C03B 23/023* (2006.01)

(52) U.S. Cl.
USPC ........... 428/410; 428/212; 428/220; 428/426; 428/428; 428/688; 65/104; 65/268; 65/286; 65/64

(58) Field of Classification Search
USPC ................. 428/410, 212, 220, 426, 428, 688; 65/104, 268, 286, 64
See application file for complete search history.

(56) References Cited

U.S. PATENT DOCUMENTS

| | | | | |
|---|---|---|---|---|
| 3,287,200 A | * | 11/1966 | Hess et al. | 428/410 |
| 4,075,381 A | * | 2/1978 | Furukawa et al. | 428/192 |
| 5,198,304 A | * | 3/1993 | Kramling et al. | 428/437 |
| 5,302,176 A | | 4/1994 | Shibuya et al. | |
| 5,380,575 A | * | 1/1995 | Kuster et al. | 428/98 |
| 5,385,786 A | * | 1/1995 | Shetterly et al. | 428/432 |
| 5,397,647 A | * | 3/1995 | Kramling et al. | 428/426 |
| 5,484,657 A | * | 1/1996 | Kramling et al. | 428/426 |
| 5,536,581 A | * | 7/1996 | Shetterly et al. | 428/432 |

(Continued)

FOREIGN PATENT DOCUMENTS

| | | |
|---|---|---|
| JP | 63-017777 | 4/1988 |
| JP | 63-017778 | 4/1988 |

(Continued)

OTHER PUBLICATIONS

U.S. Appl. No. 13/562,921, filed Jul. 31, 2012, Yamakawa, et al.

(Continued)

*Primary Examiner* — David Sample
*Assistant Examiner* — Lauren Colgan
(74) *Attorney, Agent, or Firm* — Oblon, Spivak, McClelland, Maier & Neustadt, L.L.P.

(57) ABSTRACT

A glass sheet for a laminated glass to be fit into a frame of an automobile in a flash-mount structure, that is a glass sheet having a good strength, is provided. In the glass sheet of the present invention, the maximum value of the plane compressive stress on the edge of the glass sheet is at least 10 MPa and at most 18 MPa, and the maximum value of the plane compressive stress inside from the edge of the glass sheet is at most 2.4 MPa.

20 Claims, 10 Drawing Sheets

(56) References Cited

U.S. PATENT DOCUMENTS

| | | | |
|---|---|---|---|
| 5,972,513 A * | 10/1999 | Yoshizawa | 428/410 |
| 6,200,665 B1 * | 3/2001 | Seto | 428/192 |
| 6,656,597 B2 * | 12/2003 | Takahara | 428/432 |
| 6,705,116 B2 * | 3/2004 | Matsuo et al. | 65/107 |
| 6,834,905 B2 * | 12/2004 | Okamoto et al. | 296/84.1 |
| 7,070,863 B2 * | 7/2006 | Meerman | 428/428 |
| 2002/0106519 A1 * | 8/2002 | Takahara | 428/426 |
| 2004/0098946 A1 * | 5/2004 | Meerman | 52/786.12 |
| 2005/0266247 A1 * | 12/2005 | Yoshizawa | 428/410 |
| 2005/0268661 A1 | 12/2005 | Yoshizawa et al. | |

FOREIGN PATENT DOCUMENTS

| | | |
|---|---|---|
| JP | 05-058658 | 3/1993 |
| JP | 06-029148 | 4/1994 |
| JP | 11-011989 | 1/1999 |
| JP | 3295909 | 4/2002 |
| JP | 2002-234756 | 8/2002 |
| JP | 2002-308635 | 10/2002 |
| JP | 2004-508995 | 3/2004 |
| JP | 3556220 | 5/2004 |
| JP | 2005-343720 | 12/2005 |

OTHER PUBLICATIONS

International Search Report issued Apr. 5, 2011 in PCT/JP2011/052174 filed Feb. 2, 2011.

* cited by examiner

GLASS PLATE AND PROCESS FOR PRODUCING GLASS PLATE

TECHNICAL FIELD

The present invention relates to a glass sheet, in particular, to a glass sheet constituting a laminated glass to be used as a window glass for automobiles, which has good plane compressive stress and plane tensile stress, and to a process for producing such a glass sheet.

BACKGROUND ART

A laminated glass is a glass formed by bonding two glass sheets with a plastic interlayer made of e.g. PVB (polyvinyl butyral) interposed between them, and such a laminated glass is used as a windshield as well as a door glass of an automobile. This type of laminated glass is formed into a curved shape from the viewpoint of a body line and design of an automobile.

As the method for bending a glass sheet to be employed for a laminated glass, there is a method of placing a flat-plate shaped glass sheet on a forming mold having a bending-forming surface corresponding to a desired curved shape, and the forming mold is conveyed into a heating furnace, thereby to heat the glass sheet into the vicinity of the glass-softening point in the heating furnace. In this forming method, since the glass sheet is softened to be bent along the bending-forming surface of the forming mold by gravity, a glass sheet having a desired curved surface is produced. Further, as another bending method, a method of pressing a glass sheet heated and placed on a forming mold from upper side by a pressing means to bend the glass sheet, is also known.

A laminated glass for an automobile is fixed as it is fitted to a frame of an automobile, and at this time, in order to avoid breakage of the laminated glass, a plane compressive stress (hereinafter in this specification, a plane compressive stress formed at the edge of a glass sheet is referred to as edge compression, and it is abbreviated to as E/C) is formed at the edge of the glass sheet. In the glass sheet in which a residual stress is formed, a surface compressive stress is formed on the surface and an inner tensile stress is formed inside in the cross-sectional direction of the glass sheet. The plane residual stress is defined as follows. Namely, it is an integral value of the surface compressive stress and the inner tensile stress integrated along the cross-sectional direction of a glass sheet, and when the surface compressive stress is larger, the plane residual stress becomes a plane compressive stress. A region adjacent to the region of plane compressive stress, becomes a region of plane tensile stress wherein inner tensile stress is larger so as to balance with the plane compressive stress. In a region right inside from the edge, in order to balance with E/C, a plane tensile stress (hereinafter, in this specification, a plane compressive stress formed in a region just inside the edge of a glass sheet is referred to as inner tension, and it is hereinafter abbreviated to as I/T) is formed along the edge. This I/T has a peak in a peripheral region within about 50 mm inside from the edge of the glass sheet. When E/C is large, of course I/T is also large. A large plane tensile stress indicates that the plane tensile stress layer in this portion of the glass sheet is thin in the cross-sectional direction, and accordingly, the peripheral portion is a portion that tends to be destroyed as compared with the edge or the internal portion.

In a conventional laminated glass, since the edge and the peripheral portion of the glass sheet is covered with e.g. a mole made of a resin, there has not been a problem even if a certain degree of large I/T is formed. However, in a flash mount structure (a structure of fixing a laminated glass so that the body surface and the glass surface share a substantially the same plane) that is required as an automobile design, since the peripheral portion is exposed to the car-exterior side, it is required to reduce I/T.

Further, in recent years, from a demand for reducing weight of an automobile or from the viewpoint of safety of a passenger at a time of collision, component glass sheets each having a relatively small thickness of from about 1.5 to 3.2 mm are employed for a laminated glass. In order to fit such thin glass sheets to an automobile body by using a flash mount structure without breaking the glass sheets, it is necessary to prepare glass sheets having sufficiently large E/C and sufficiently small I/T.

Patent Document 1 being a prior art document discloses a glass sheet having a thickness of from 1.5 to 2.5 mm, which is a glass sheet for a laminated glass, wherein an E/C of from 24.5 MPa to 49.0 MPa is formed in the peripheral portion within 1.5 cm from the edge of the glass sheet. Since this glass sheet has a large E/C, the glass sheet inevitably has a large I/T. Accordingly, when the glass is designed so that the portion wherein I/T is formed is exposed to the car-exterior side, the glass tends to be fragmented by e.g. a flying stone.

Patent Document 2 discloses a glass sheet for a laminated glass, which is a glass sheet having a thickness of from 1.5 to 2.5 mm, wherein an E/C of from 19.6 MPa to 34.3 MPa is formed in the peripheral portion within 1.5 cm from the edge of the glass sheet, and an I/T of at most 7.8 MPa is formed in the internal region adjacent to the peripheral portion. Since this glass sheet has a large E/C and a large I/T, there is the same problem as that of Patent Document 1.

Patent Document 3 discloses a glass sheet for a laminated glass, wherein an E/C of from 4.9 MPa to 49.0 MPa is formed in the peripheral portion of the glass sheet. However, the document is silent as to I/T.

Patent Document 4 discloses a glass sheet for a laminated glass, which is a glass sheet having a thickness of from 1.5 to 4 mm, wherein an E/C of from 50 MPa to 100 MPa is formed in the peripheral portion of the glass sheet, and an I/T of smaller than 10 MPa is formed in an internal region adjacent to the peripheral portion. Since this glass sheet has a large E/C, it has a large I/T and there is the same problem as that of Patent Document 1.

Patent Document 5 discloses a glass sheet for a laminated glass wherein the maximum value of E/C is larger than 29.4 MPa and a glass sheet for a laminated glass wherein the maximum value of I/T is smaller than 3.9 MPa. Since this glass sheet also has a large E/C, the glass sheet has a large I/T, and there is the same problem as that of Patent Document 1.

Patent Document 6 discloses a glass sheet for a laminated glass, which is a glass sheet having a thickness of from 1.1 to 2.6 mm, wherein an E/C of from 20 MPa to 80 MPa is formed in the periphery of the glass sheet, and an I/T of from 0 to 15 MPa is formed its inside region. Since this glass sheet also has a high E/C, it has also a high I/T, and there is the same problem as that of Patent Document 1.

Patent Document 7 discloses a glass sheet wherein the plane residual stress monotonously changes from compressive stress to tensile stress from the peripheral portion of the glass sheet toward the central portion of the glass sheet, an E/C of at least 15 MPa is formed in the peripheral portion of the glass sheet, and a plane tensile stress of at most 2.5 MPa having no peak is formed in a region inside from the peripheral portion. Namely, in this glass sheet, no UT is present, and plane tensile stress is formed in the entire central region of the glass sheet. Since there is no I/T, it is possible to avoid a problem that a surface compressive stress layer becomes thin, but the production method is applicable only to a glass sheet such as a door glass of an automobile having a curvature in one direction.

PRIOR ART DOCUMENTS

Patent Documents
Patent Document 1: JP-B-63-17777
Patent Document 2: JP-B-63-17778
Patent Document 3: JP-B-6-29148
Patent Document 4: Japanese Patent No. 3295909
Patent Document 5: Japanese Patent No. 3556220
Patent Document 6: JP-A-2004-508995
Patent Document 7: JP-A-11-11989

DISCLOSURE OF INVENTION

Technical Problem

As described above, the glass sheets disclosed in Patent Documents 1 to 6 have a problem that they do not have E/C and I/T suitable for a glass sheet for a laminated glass to be fit into a frame of an automobile by a flash-mount structure. Further, the glass sheet disclosed in Patent Document 7 has a problem that a portion of the glass sheet applicable is limited.

The present invention has been made under the circumstances, and it is an object of the present invention to provide a glass sheet having a good strength as a glass sheet for a laminated glass to be fitted into a frame of an automobile by a flash-mount structure, and a process for producing such a glass sheet.

Solution to Problem

In order to achieve the above objects, the present invention provides a glass sheet which comprises a peripheral region having a certain width along the periphery of the glass sheet, and having an edge compression formed; an intermediate region adjacent to the inner peripheral side of the peripheral region, having a certain width, and having an inner tension formed; and a central region occupying the inner peripheral side of the intermediate region, and having a plane stress of zero on the border with the intermediate region; wherein the maximum value of the edge compression in the peripheral region is at least 10 MPa and at most 18 MPa, and the maximum value of the inner tension in the intermediate region is at most 2.4 MPa.

Further, in order to achieve the above objects the present invention provides a glass sheet which comprises a peripheral region having a certain width along the periphery of the glass sheet, and having an edge compression formed; an intermediate region adjacent to the inner peripheral side of the peripheral region, having a certain width, and having an inner tension formed; and a central region occupying the inner peripheral side of the intermediate region, and having a plane stress of substantially zero on the border with the intermediate region; wherein the maximum value of the edge compression in the peripheral region is at least 10 MPa and at most 18 MPa, and the maximum value of the inner tension in the intermediate region is at most 2.4 MPa.

In the present invention, particularly in a glass sheet having a thickness of from 1.5 to 3 mm, the maximum value of the edge compression of the glass sheet is set to be at least 10 MPa and at most 18 MPa, and the maximum value of the inner tension of the glass sheet is set to be at most 2.4 MPa. As a result, it is possible to provide a glass sheet having a good strength required for a glass sheet for a laminated glass to be fit into a frame of an automobile in a flash-mount structure.

Further, in the present invention, it is preferred that the intermediate region is formed in a region less than 60 mm from the edge of the glass sheet. Since the surface compressive stress layer is slightly thin in a region in which inner tension is formed, it is not preferred that the intermediate region spreads in a wide region.

Further, in the present invention, it is more preferred that the maximum value of the inner tension in the intermediate region is at most 1.8 MPa.

In the present invention, by making the maximum value of the inner tension in the intermediate region to be at most 2.4 MPa, preferably at most 1.8 MPa, it is possible to provide a glass sheet having a higher guaranteed strength as a glass sheet for a laminated glass to be fit into a frame of an automobile in a flash-mount structure.

Here, in the present invention, the plane stress in the central region of the glass sheet is not an issue. The plane stress in the glass sheet is approximately zero, but the plane stress may be once zero at the border between the intermediate region and the central region, and a region of plane compressive stress may be formed in the central region.

Further, the present invention provides a laminated glass comprising at least two glass sheets bonded via an interlayer, wherein at least one of the glass sheets is the above glass sheet. Since the laminated glass employs glass sheets having good strength, it is suitable as a laminated glass to be fit into a frame of an automobile in a flash-mount structure.

Further, in order to produce the glass sheet of the present invention, the present invention provides a process for producing a glass sheet, which comprises a heating-forming step of heating and bending a glass sheet, and an annealing step of lifting up the glass sheet in a high-temperature state of at least the strain point placed on a ring-shaped forming mold, by a lift-up member to separate the glass sheet from the forming mold and annealing the glass sheet; wherein the annealing step comprises, before lifting up the glass sheet, cooling a region of the glass sheet at least 50 mm inside from the edge of the glass sheet including at least the position that contacts with the lift-up member at the time of lifting up the glass sheet, to a temperature of at most the strain point before the edge of the glass sheet reaches the strain point; forming a state that when the temperature of the edge is the annealing point +20° C., the temperature of the edge is at least 3° C. lower than the temperature of a point 10 mm inside from the edge; and forming a state that when the temperature of the edge is the strain point, the temperature of the edge is at least 8° C. lower than the temperature of the point 10 mm inside from the edge.

Further, the present invention provides a process for producing a glass sheet, which comprises a heating-forming step of heating and bending a glass sheet, and an annealing step of annealing the glass sheet in a high-temperature state of at least the strain point placed on a ring-shaped forming mold; wherein the annealing step comprises lifting up the glass sheet by a lift-up member to separate the glass sheet from the forming mold; and before the lifting up the glass sheet, cooling a region of the glass sheet at least 50 mm inside from the edge of the glass sheet including at least the position that contacts with the lift-up member at the time of lifting up the glass sheet, to a temperature of at most the strain point before the edge of the glass sheet reaches the strain point; forming a state that when the temperature of the edge is the annealing point +20° C., the temperature of the edge is at least 3° C. lower than the temperature of a point 10 mm inside from the edge; and forming a state that when the temperature of the edge is the strain point, the temperature of the edge is at least 8° C. lower than the temperature of the point 10 mm inside from the edge.

With the present invention, since a region of a glass sheet cooled to a temperature below the strain point by a cooling device is lifted up by a lift-up member, it is possible to lift up the glass sheet from a forming mold without generating a strain.

Further, the position to be lifted up by the lift-up member is set in a region at least 50 mm inside from the edge of the glass sheet. This means that the position to be lifted up is set in a region distant from a peripheral portion (region within 50 mm inside from the edge) wherein a peak of UT is considered to be present, and accordingly, it is possible to prevent lowering of cooling speed in the peripheral portion due to contact with the lift-up member. As a result, it is possible to reduce I/T. Since the temperature of the edge at this time is at most the strain point, it is possible to make E/C sufficiently high. Here, the region to be lifted up is a region present in a region other than the peripheral portion of the glass sheet. Typically, it is a region in more inner side from the peripheral portion of a bent glass sheet, and that is a region including the central region of the glass sheet.

Further, in the annealing step, by forming a state that the temperature of the edge of the glass sheet is at least 3° C. lower than the temperature at a position 10 mm inside from the edge when the temperature of the edge is the annealing point +20° C., it is possible to expect a sufficient relaxation of stress. Further, by forming a state that the temperature of the edge is at least 8° C. lower than the temperature at a position 10 mm inside from the edge when the temperature of the edge reaches the strain point, it is possible to obtain a high E/C.

Further, in the present invention, it is preferred that the annealing step forms a state that the temperature of the edge is at least 8° C. lower than the temperature of a point 10 mm inside from the edge when the temperature of the edge is the annealing point. With this construction, it is possible to more securely form a high stress distribution of E/C.

Further, in the present invention, it is preferred that in the annealing step, the glass sheet G is lifted up by the lift-up member when the temperature of the edge is higher than the strain point −10° C.

Before the temperature of the edge of the glass sheet reaches the strain point or about the strain point −10° C., a state that the temperature of the edge is at least 8° C. lower than the temperature at a point 10 mm inside from the edge is maintained for a few seconds to a few tens of seconds, whereby it is possible to increase E/C. Further, the glass sheet G is lifted up at a timing when the temperature of the edge is higher than the strain point, whereby there is an effect that the temperature difference can be easily produced at the strain point.

Further, in the present invention, it is preferred that in the annealing step, the glass sheet G is lifted up by the lift-up member when the temperature of the edge is higher than the annealing point. With this method, it is possible to more securely produce a temperature difference of at least 8° C. between the edge and the position 10 mm inside from the edge at the annealing point.

Further, in the present invention, it is preferred that in the heating-forming step, the glass sheet is heated to the annealing point +32° C. By thus producing a high-temperature state, it is possible to securely relax the stress.

Further, the present invention provides a process for producing a laminated glass employing at least one glass sheet produced by the above process for producing a glass sheet, and bonding at least two glass sheets via an interlayer. With the present invention, it is possible to produce a laminated glass suitable to be fit into a frame of an automobile in a flash-mount structure.

Advantageous Effects of Invention

As described above, in the glass sheet of the present invention, since the maximum value of the edge compression of the glass sheet is set to be at least 10 MPa and at most 18 MPa and the maximum value of the inner tension of the glass sheet is set to be at most 2.4 MPa, it is possible to provide a glass sheet having a good strength as a glass sheet for a laminated glass to be fit into a frame of an automobile in a flash-mount structure. Further, with the process for producing a glass sheet of the present invention, it is possible to form a sufficiently small I/T and a sufficiently high E/C.

Further, with the process for producing a laminated glass of the present invention, it is possible to obtain a laminated glass having a high edge strength and a low I/T.

Figure 14:
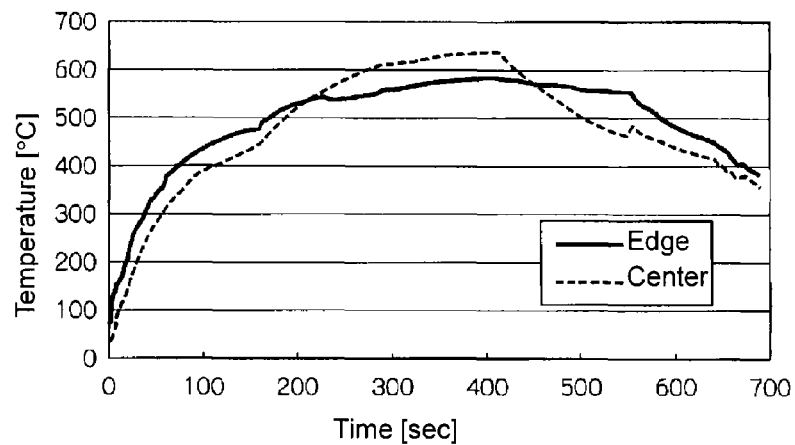

FIG. 14 is a graph of Example 5 showing the temperature histories of the edge of the glass sheet and a cooling region with respect to a lapse of temperature measurement time of the glass sheet.

Figure 15:
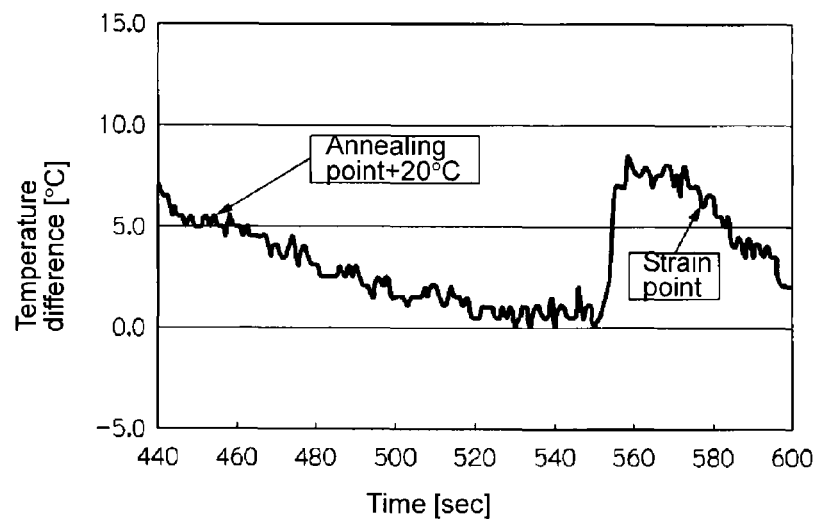

FIG. 15 is a graph of Example 5 showing the temperature difference between the edge of a glass sheet and a position 10 mm inside from the edge with respect to lapse of temperature measurement time of the glass sheet.

Figure 16:
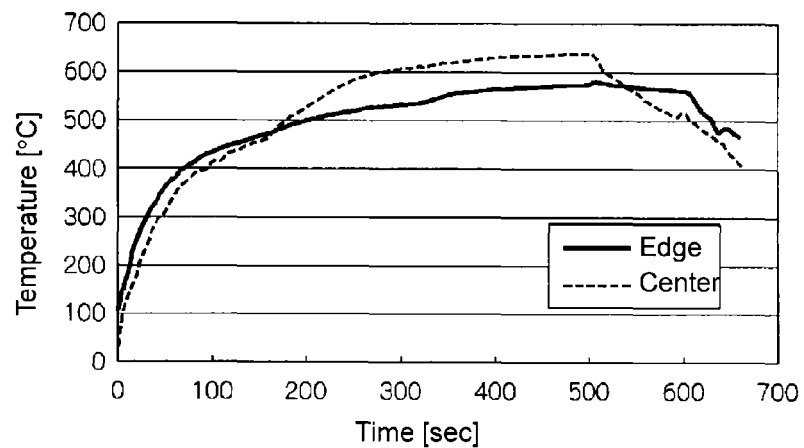

FIG. 16 is a graph of Example 6 showing the temperature histories of the edge of the glass sheet and a cooling region with respect to a lapse of temperature measurement time of the glass sheet.

Figure 17:
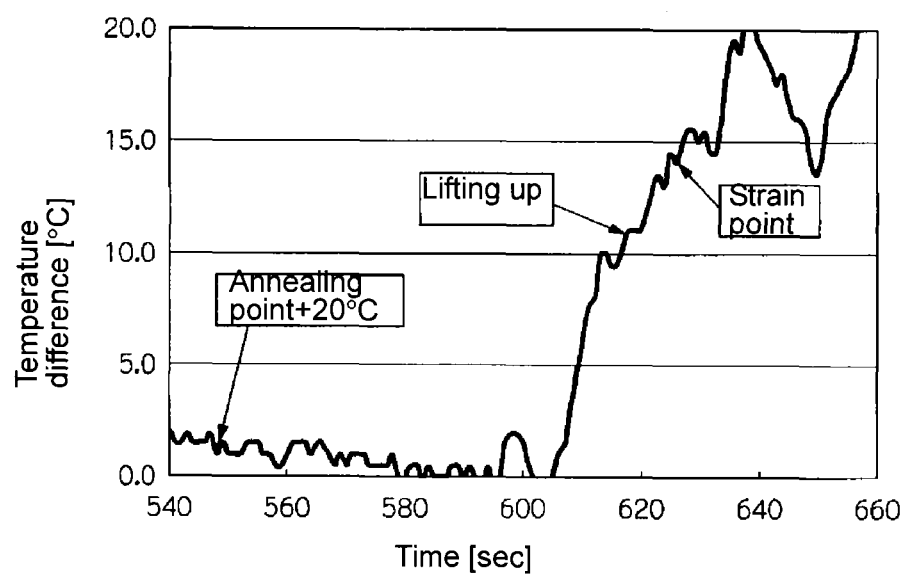

FIG. 17 is a graph of Example 6 showing the temperature difference between the edge of a glass sheet and a position 10 mm inside from the edge with respect to lapse of temperature measurement time of the glass sheet.

Figure 18:
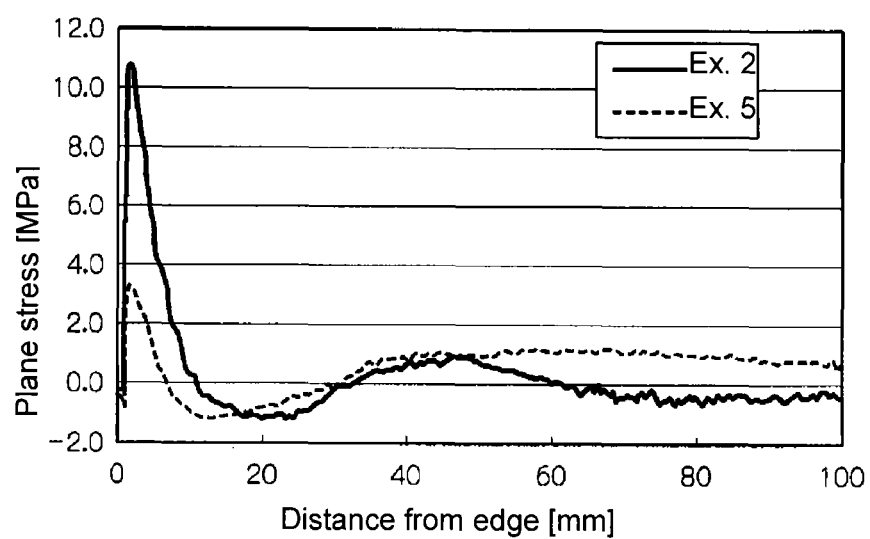

FIG. 18 is a graph showing the stress distributions of plane stresses of glass sheets of Examples 2 and 5.

DESCRIPTION OF EMBODIMENTS

Now, preferred embodiments of the glass sheet and the method for producing a glass sheet according to the present invention will be described with reference to attached drawings.

Figure 1:
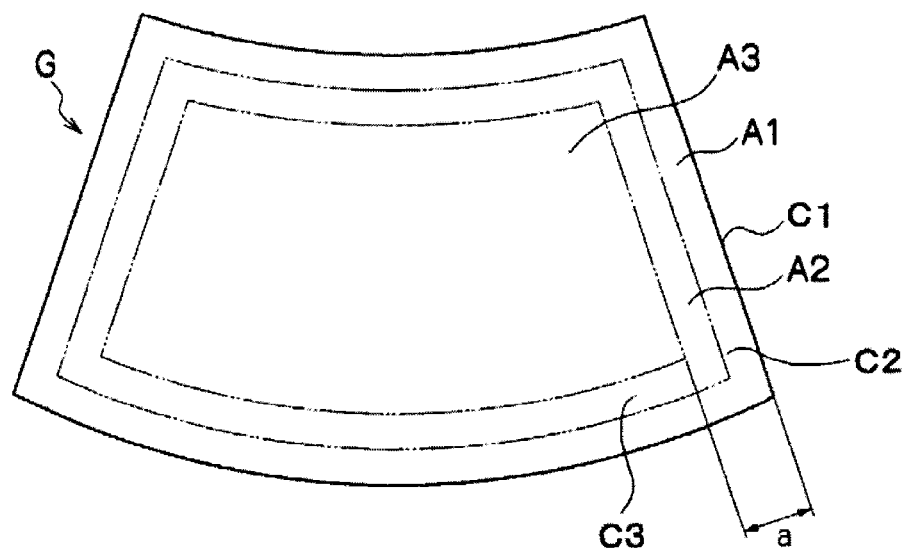
FIG. 1 is a plan view showing an embodiment of the glass sheet of the present invention.

FIG. 1 shows a plan view of a glass sheet G according to the present invention. The glass sheet G shown in the figure may be a single glass sheet G or it may be a laminated glass formed by bonding at least two glass sheets G via an interlayer.

The glass sheet G is a glass sheet having a thickness of from 1.5 to 3.0 mm. Further, the glass sheet G has a peripheral region A1 having a predetermined width along the periphery of the glass sheet G, and having an edge compression formed; an intermediate region A2 adjacent to the inner peripheral side of the peripheral region A1, having a predetermined width, and having an inner tension formed; and a central region A3 occupying the inner peripheral side of the intermediate region A2, and having a plane stress of zero on the border with the intermediate region A2.

In FIG. 1, C1 indicates the edge of the glass sheet G, that is a side on the periphery of the glass sheet G, a chain-dashed line C2 indicates, for example, a line connecting points at a predetermined distance inside from the edge C1 of the glass sheet G, and the chain-dashed line C3 indicates, for example, points at a predetermined distance inside from the edge C1 of the glass sheet G. Accordingly, the above peripheral region A1 is a band-shaped peripheral region of the glass sheet G encompassed by the edge C1 and the chain-dashed line C2, and the above intermediate region A2 is a band-shaped more internal peripheral region of the glass sheet G encompassed by the chain-dashed line C2 and the chain-dashed line C3, that is adjacent to the inner periphery of the peripheral region A1 of the glass sheet G. The chain-dashed line C2 and the chain-dashed line C3 are appropriately determined according to the size and the thickness of the glass sheet, and for example, the chain-dashed line C2 indicates a line connecting points 10 mm inside from the edge C1 of the glass sheet G, and the chain-dashed line C3 indicates a line connecting points 60 mm inside from the edge C1 of the glass sheet G.

In this glass sheet G, the maximum value of edge compression formed in the peripheral region A1 is at least 10 MPa and at most 18 MPa, and the maximum value of inner tension formed in the intermediate region A2 is at most 2.4 MPa.

Further, the intermediate region A2 of the glass sheet G is preferably formed in a region less than "a" (a=60 mm) from the edge G3 of the glass sheet G. Further, the maximum value of inner tension formed in the intermediate region A2 is preferably at most 1.8 MPa.

Now, a method for producing the glass sheet G of the present invention shown in FIG. 1 will be described.

FIG. 2(A) is a schematic side view of a bending apparatus 14 for a laminated glass, which is a production apparatus for producing the glass sheet G of the present invention, which includes an annealing furnace (annealing state) 10 provided with an annealing apparatus, and a heating furnace 12 provided as a prior stage to the annealing furnace 10. FIG. 2(B) is a schematic plan view of the bending apparatus 14 for a laminated glass.

A glass sheet G to be produced by the apparatus 14 for producing a glass sheet for a laminated glass, is a windshield for an automobile having a thickness of from 1.3 to 3.0 mm in terms of the thickness of each component glass sheet, but the glass sheet is not limited to a windshield. Namely, the glass sheet G may be a glass sheet such as a windshield having a bent shape of large curvature and having curvatures in a plurality of directions, or it may be a side glass having a bent shape of small curvature and having a curvature in only one direction. The glass sheet G is heated and bent while it passes through the heating furnace 12 in a state that it is placed on a ring-shaped forming mold 16 supporting the edge of the glass sheet G, and thereafter, the glass sheet G is annealed in the annealing apparatus disposed in the annealing furnace 10, to produce a curved glass sheet for a laminated glass.

In more detail, the flat plate-shaped glass sheet G before bending is placed on a forming mold 16 for gravity bending placed on a moving table 18, and conveyed into the heating furnace by a conveying means having an appropriate construction. While the glass sheet G passes through the heating furnace 12, the glass sheet G is heated to a temperature in the vicinity of the softening point (for example, from 580 to 700° C.) by a heater that is not shown. Then, the glass sheet G is softened by the heating and bent by gravity in a state that the edge of the glass sheet G is supported along the curved shape of the forming mold, so as to be bent into a curved shape. By this method, the flat plate-shaped glass sheet G is bent into a glass sheet having a desired curved surface.

The bent glass sheet G is conveyed from the heating furnace 12 into the annealing furnace 10 by the conveying means while the glass sheet G is in a high-temperature state together with the forming mold 16. In the annealing furnace 10, the glass sheet G is subjected to a predetermined annealing treatment by an annealing apparatus. This annealing treatment will be described later. Thereafter, the glass sheet G is conveyed out from the annealing furnace 10 and radiation-cooled. By applying such heating, bending and annealing steps, the flat plate-shaped glass sheet G is processed into a curved glass sheet G for a laminated glass. Here, the forming mold 16 and the moving table 18 are composed of heat-resistant members durable against the glass sheet-forming temperature (580 to 700° C.) in the heating furnace 12. Here, the bending method of the glass sheet G is not limited to the gravity bending, but various known forming methods such as a press molding by pressing a pressing mold against a glass sheet placed on a forming mold, may be employed. In this case, the glass sheet press-molded by the pressing mold is subsequently transferred on a ring-shaped forming mold, and is subjected to the annealing method of the present invention.

In the annealing furnace 10, besides the conveying apparatus for conveying the forming mold 16 on which the glass sheet is placed, an annealing apparatus comprising a pair of cooling devices 20, 22 and a lift-up member 36, is provided.

Figure 3:
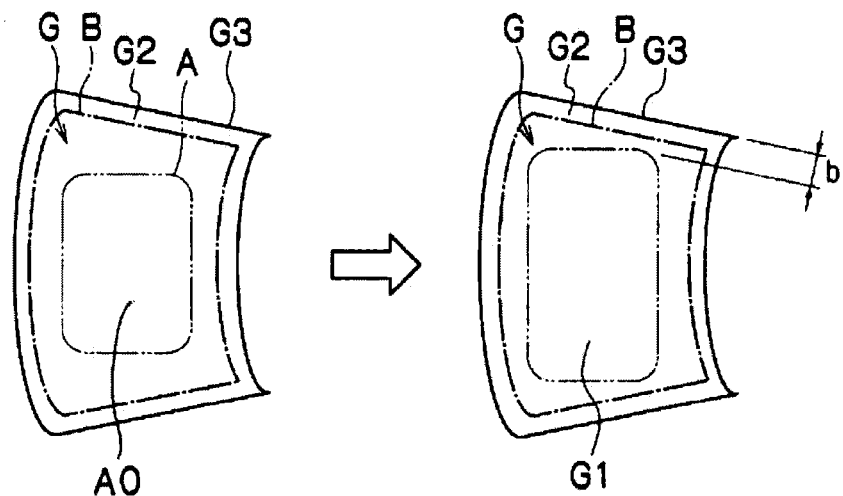
FIG. 3 is a plan view of a glass sheet, which illustrates the temperature changes of the inner portion and the peripheral portion of the glass sheet.

A chain double-dashed line A in the left side glass sheet G in FIG. 3 shows an outer periphery connecting portions to be lifted up by the lift-up member 36, and a region encompassed by the chain double-dashed line A includes a region (A0) to be lifted up. Usually, the region A0 to be lifted up is a region including the central region of the glass sheet. Further, a region G2 encompassed by the edge G3 of the glass sheet G and a chain dashed line B shows a peripheral portion of the glass sheet G. Here, the chain dashed line B is, for example, a line connecting portions 10 mm inside from the edge G3 of the glass sheet G. Hereinafter, in this specification, the region G2 of the glass sheet G encompassed by the edge G3 and the chain dashed line B is referred also to as a peripheral portion.

Further, G3 shows the edge of the glass sheet G, and a region G2 encompassed by the edge G3 and the chain dashed line B shows a peripheral portion of the glass sheet G.

A pair of cooling devices 20, 22 are disposed above and below across the glass sheet G, and by these cooling devices 20, 22, the region of the glass sheet G to be lifted up is cooled to a temperature of at most the strain point (for example, 510° C.). More preferably, the region to be lifted up is cooled to a temperature below the strain point (510° C.).

Namely, in the glass sheet G before its surface is cooled by the cooling devices 20, 22, since a portion close to the outer periphery tends to undergo heat dissipation, the region of the left side glass sheet in FIG. 3 encompassed by the chain double-dashed line A including the region to be lifted up is in a high-temperature state as compared with the peripheral region G2. Then, the cooling devices 20, 22 of FIG. 2 locally cool the cooling region G1 encompassed by the chain double-dashed line of the right side glass sheet G in FIG. 3, that is at least equal or wider than the region encompassed by the chain double-dashed line A. By this method, the cooling region G1 is cooled faster than the peripheral portion G2. Namely, when the cooling region G1 is cooled to a temperature of at most the strain point, the peripheral portion G2 is still in a higher-temperature state than the cooling region G1, and at least the temperature of the edge G3 is at least the strain point, and cooling of the edge of the glass sheet G starts from a temperature of at least the strain point.

The cooling region G1 is, for example, a region at least "b" (b=50 mm) inside from the edge G3 of the glass sheet, and it indicates a region including the region to be lifted up. In order to more securely delay the cooling of the peripheral portion G2, it is possible to make the cooling region G1 to be a region of the glass sheet G wherein "b" is at least 100 mm. The peripheral portion G2 is within an area of the peripheral region A1 and the intermediate region A2, the intermediate region A2 is a region wherein I/T is formed, but the peripheral portion G2 is defined as a region wherein a peak of I/T is present.

Figure 2:
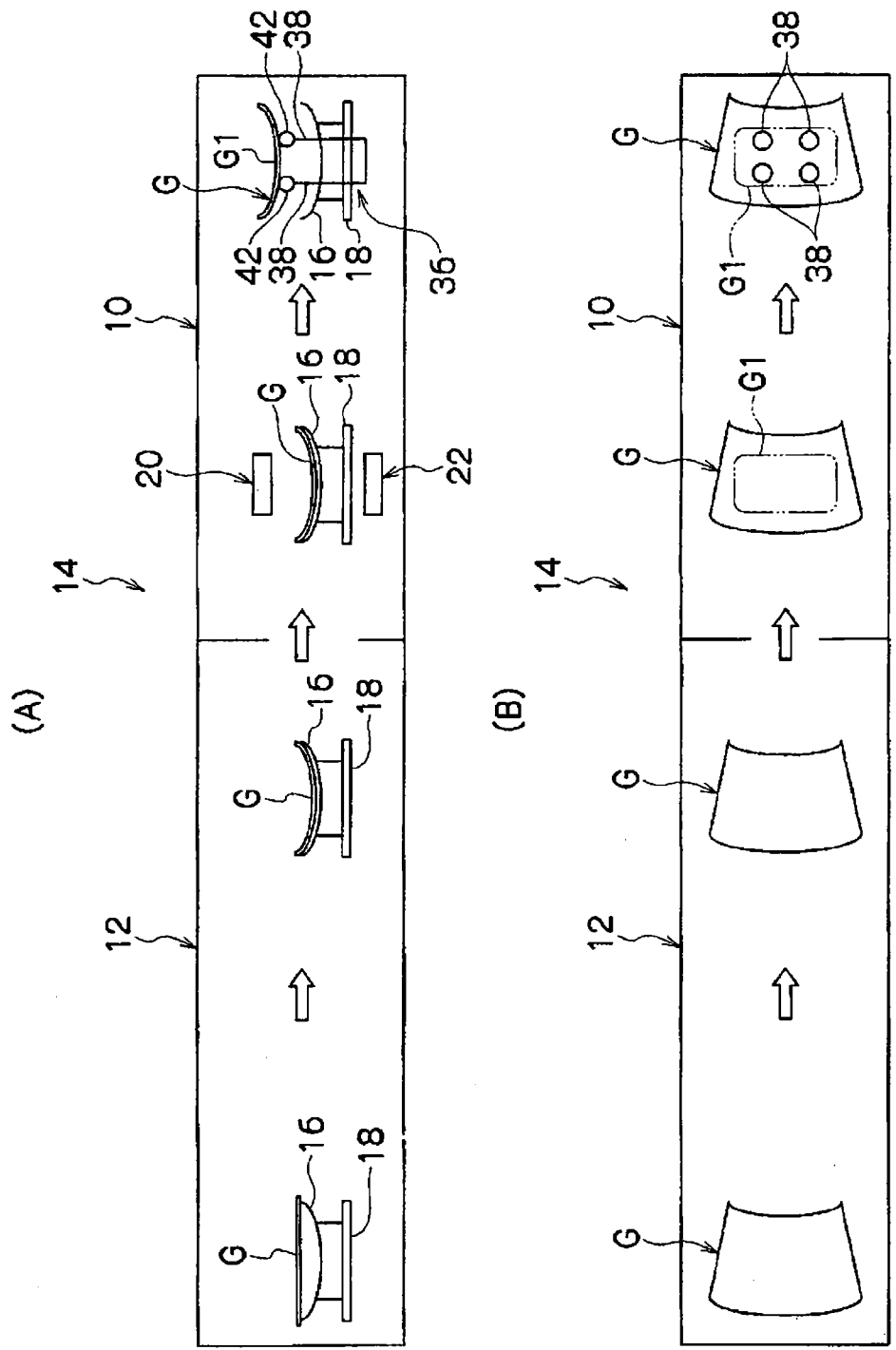
FIGS. 2(A) and 2(B) are a side view and a plan view, respectively, of an apparatus for producing a glass sheet for a laminated glass, provided with the apparatus for annealing a glass sheet of the present invention.

Further, the glass sheet G shown on the left side of FIG. 2, is a glass sheet G right after the glass sheet G is conveyed into the annealing furnace 10. The glass sheet G shown on the right side of FIG. 3 is a glass sheet G just before the glass sheet G is lifted up by the lift-up member 36 to be described later.

Figure 4:
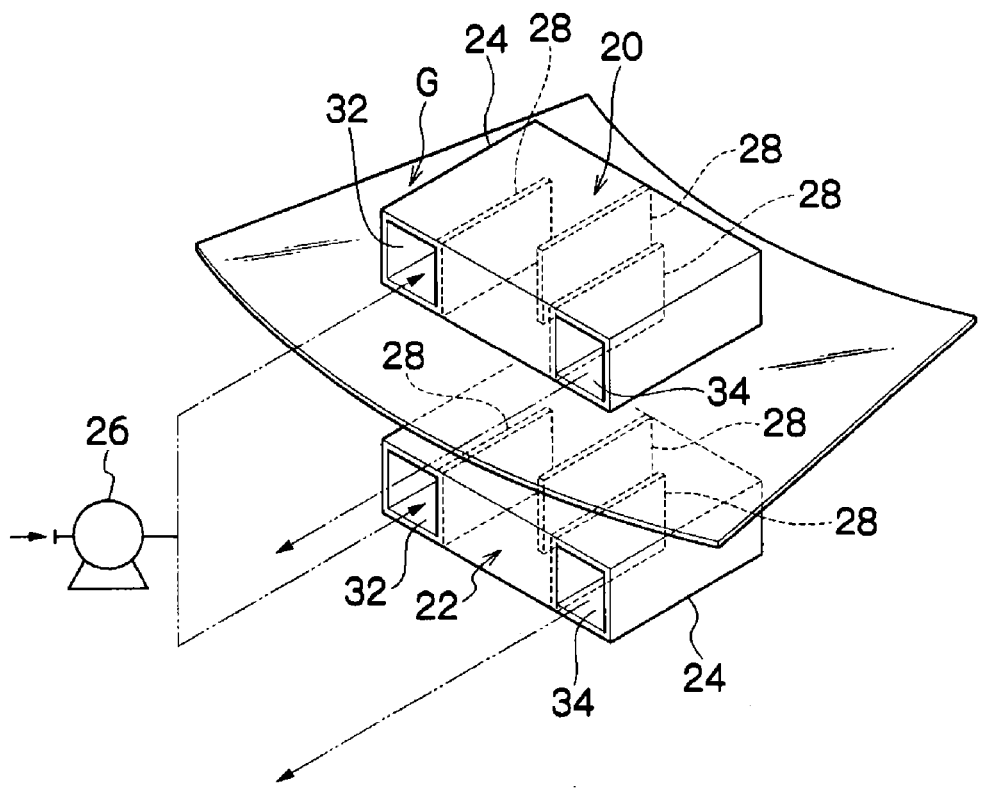
FIG. 4 is a perspective view showing the positional relationship between the glass sheet and cooling boxes of cooling devices.

FIG. 4 is a perspective view showing an example of the relationship among the cooling devices 20, 22 and the glass sheet G.

A typical example of the cooling device 20 on the upper side of the figure is constituted by a box-shaped cooling box (casing) 24 made of a metal and a blower (air supply device) 26 for supplying a cooling air to the cooling box 24. The cooling box 24 is disposed above the glass sheet G with a predetermined gap, and is formed in a rectangular solid shape so as to locally cool the cooling region G1 shown in FIG. 3. Here, since the cooling region G1 is not limited to rectangle, the shape of the cooling box 24 is preferably a universal shape so as to correspond to a lift-up member disposed so as to be adapted to various models of glass sheets. By making vertical×horizontal dimensions of the cooling box smaller than 800×1,200 mm, preferably smaller than 400×800 mm, a universal cooling device corresponding to the lift-up member is obtained. Further, this cooling box 24 has a size adapted to be disposed in a region at least 100 mm inside from the edge G3 of the glass sheet G. By using a cooling box having such a size, it is possible to locally radiation-cool only a region at least 50 mm inside from the edge G3 of the glass sheet G (that is a region encompassed by the line at least 50 mm inside from the edge of the glass sheet G in the entire periphery of the glass sheet G), that is, a region other than the peripheral portion G2.

In a case of locally cooling the cooling region G1 shown in FIG. 3, the shape of the cooling box 24 in plan view has a slightly smaller similar shape of the cooling region G1. Further, the size is determined according to the distance between the cooling box 24 and the glass sheet G. Then, the cooling box 24 is disposed so that the gravity centers of the cooling box and the glass sheet agree to each other in plan view.

By controlling the surface temperature of the cooling box 24 (a surface facing to the glass sheet G) to be between 300 and 350° C., the cooling region G1 is radiation-cooled. By this method, it is possible to efficiently cool the cooling region G1 of the glass sheet G to a temperature of at most the strain point.

Further, inside the cooling box 24, three partition plates 28, 28, 28 are disposed in a staggered form, whereby a meander-shaped ventilation flue 30 is formed in the entire region inside the cooling box 24. Further, on one side of the cooling box, an entrance 32 communicating with one end of the ventilation flue 30 is provided, and an exit 34 communicating with the other end of the ventilation flue 30 is provided. The entrance 32 communicates with a blower 26 via a duct not shown, and the exit 34 communicates with an exhaust duct, not shown.

The blower 26 supplies an external air or a cooling air whose temperature is controlled between 20 and 50° C. by a controller, not shown, to the entrance 32 via the duct. The supplied air cools the cooling box 24 while the air passes through the ventilation flue 30. Accordingly, a heat exchange takes place between the air and the cooling box 24 heated by the radiation heat from the glass sheet G, and as a result, the air having a temperature of from 250 to 300° C. is exhausted from the exit 34. The exhausted air flows through the exhaust duct and is exhausted to the outside the annealing furnace 10. Thus, since the cooling box 24 is cooled by the cooling air, it is possible to control the surface temperature of the cooling box 24 to be between 300 and 350° C.

The cooling device 22 in the lower position in the figure has the same construction as the cooling device 20 in the upper position, and the same symbols as those of the cooling device 20 are applied and the explanation of the cooing device 22 is omitted. Here, it is not essential that both of the upper and lower cooling devices are required, and the cooling may be conducted by either one of the cooling devices. As described above, only the cooling region G1 of the glass sheet G is cooled to a temperature of at most the strain point by the cooling devices 20, 22.

Here, the cooling devices 20, 22 of this embodiment have a function of cooling the cooling region G1 of the glass sheet G by radiation cooling, but they may be devices for cooling the cooling region G1 by blowing a gas against the cooling region G1. However, such a cooling method of blowing a gas may cause a problem that the gas collided with the glass sheet G also cools the peripheral portion G2 and the edge G3, whereby it is difficult to control the stress distribution formed in the glass sheet G. Accordingly, like the embodiment, cooling devices 20, 22 for cooling by employing radiation heat are preferred.

Figure 5:
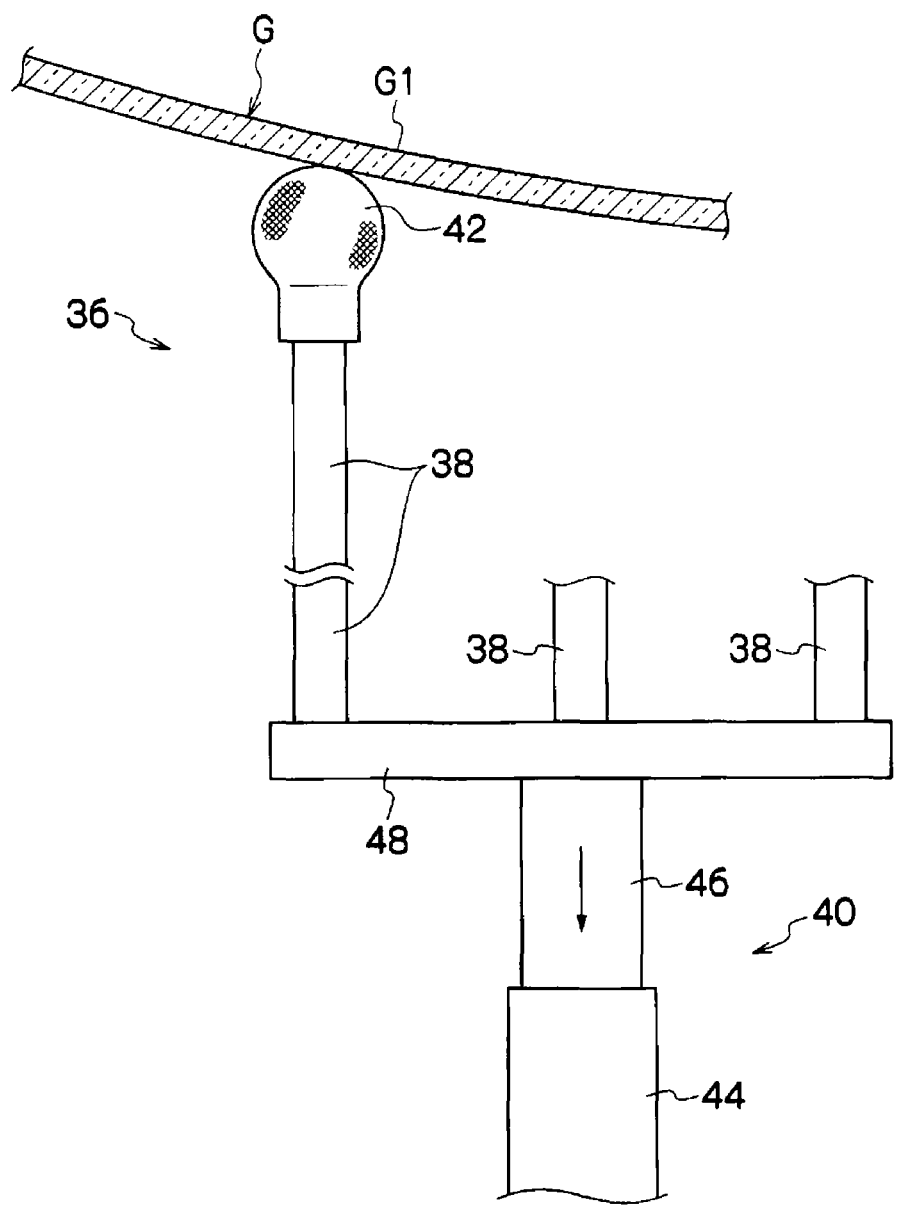
FIG. 5 is a side view showing the substantial part of a lift-up member.

In the glass sheet G wherein only the cooling region G1 has been cooled to a temperature of at most the strain point, the cooling region G1 is lifted up by a lift-up member 36 shown in FIGS. 2 and 5. The glass sheet G is annealed for a predetermined time in this state.

FIG. 5 is a side view showing a substantial part of the lift-up member 36.

The lift-up member 36 is constituted by three or four rods 38, 38 . . . and a cylinder mechanism 40 for moving up and down the rods 38, 38 . . . simultaneously. The upper end portion of each rod 38 is provided with a cushion member 42 to contact with a lower surface of the glass sheet G. The cushion member 42 is made of a heat-resistant cloth such as a stainless steel cloth, a glass fiber cloth or a cloth made of various types of heat-resistant fibers.

As shown in FIG. 5, the cylinder mechanism 40 is provided with a cylinder 44 and a piston 46, a frame 48 is connected to the upper end portion of the piston 46, and lower portions of the rods 38, 38 . . . are fixed to the upper surface of the frame 48. Accordingly, when the piston 46 of the cylinder 44 stretches, the rods 38, 38 . . . move up, and the cushion members 42, 42 . . . come into contact with the region encompassed by the chain double-dashed line A (A0 region in FIG. 3) on the lower surface of the glass sheet G. Then, by the subsequent stretch movement of the piston 46, the glass sheet G is lifted up and the entire glass sheet G is separated upwardly from the forming mold 16. The glass sheet G is annealed in this state. Here, the cylinder mechanism 40 is an example, and the rods 38, 38 . . . may be moved up by a known means such as a servo motor.

Further, in the case shown in FIG. 5, four rods 38, 38 . . . are disposed at respective corners of a rectangle encompassed by the chain double-dashed line A in FIG. 3. Further, the rectangle encompassed by the chain double-dashed line A is at most 800×1,200 mm, and at least 300×300 mm (not shown) having a common gravity weight. In such an embodiment, in a case of a glass sheet for a normal automotive windshield, the lift-up member is universally applicable and can stably lift up the glass sheet.

The lift-up member 36 is preferably disposed so that it can move in and out through an opening provided through a furnace floor of the annealing furnace 10, but as the case requires, the lift-up member can be provided integrally with the moving table 18.

As described above, since the region to be lifted up by the lift-up member 36 is set in a region at least 50 mm inside from the edge G3 of the glass sheet G, that is, since the region to be lifted up is set in a region inside from the peripheral portion where the peak of I/T is present, it is possible to prevent lowering of cooing speed of the peripheral portion, whereby it is possible to reduce UT in the intermediate region A2 and to form a sufficiently large E/C.

Further, the cooling region G1 is substantially quadrangular, but the shape may be appropriately changed according to the region to be lifted up. For example, in a case of lifting up by three rods, the cooling region G1 may be substantially triangular. Even in a case of lifting up by four rods like the figure, the cooling region G1 may be provided in each of four regions contacting the glass sheet to cool the regions.

Meanwhile, while the glass sheet G is annealed, at least the region to be lifted up by the lift-up member on the inner side from the peripheral portion G2 of the glass sheet, that is the cooling region G1 in this case, is cooled to a temperature of at most the strain point before the edge of the glass sheet reaches the strain point. Then, by making the cooling speed of the peripheral portion G2 slower than that of the cooling region G1, the temperature of the peripheral portion G2 is maintained to be high. On the other hand, the edge G3 is cooled faster than the peripheral portion G2. In this process, when the temperature of the edge G3 is the annealing point +20° C. (for example, 570° C.), a state that the temperature of the edge G3 is at least 3° C. lower than the temperature of a point inside from the edge (that is a portion corresponding to 10 mm inside from the edge) is formed. As a result, when the temperature of the edge G3 is the strain point (510° C.), a state that the temperature of the edge G3 is at least 8° C. lower than the temperature of the inside (10 mm) from the edge can be formed. Such a temperature control can be achieved, for example, by moving the glass sheet from the forming furnace to the annealing furnace and thereby cooling the edge G3. As an alternative, it can be realized by controlling the temperature of the atmosphere in the annealing furnace. This state is preferred regardless of whether it is before or after the lifting up by the lift-up member 36. By producing the predetermined temperature difference between the edge G3 and the inside (10 mm) from the edge before the temperatures reach the strain point, it is possible to expect sufficient relaxation of stress, and when the temperature difference is at least 8° C. at the strain point, a high E/C can be obtained. Here, the temperature of the edge G3 of the glass sheet G means the temperature of the outermost layer (that is the edge portion shown in G3) of the glass sheet G.

It is preferred to form a state that the temperature of the edge G3 is at least 8° C. lower than the temperature inside (10 mm) from the edge when the temperature of the edge is the annealing point (for example, 550° C.). By this method, it is possible to form a high stress distribution of E/C more securely.

Further, it is more preferred to lift up the glass sheet G by the lift-up member 36 when the temperature of the edge G3 is higher than the strain point −10° C. (for example, 500° C.). This is because in order to obtain a predetermined stress distribution, it is considered to be necessary to maintain a state that the temperature of the edge G3 is at least 8° C. lower than the temperature inside (10 mm) from the edge for a few seconds to tens of seconds before the temperature of the edge G3 reaches the strain point or before the temperature reaches the strain point −10° C. Here, there is an effect that by lifting up the glass sheet G when the temperature of the edge G3 is higher than the strain point, it is easy to produce a temperature difference when the edge G3 reaches the strain point.

More preferably, the glass sheet G is lifted up when the temperature of the edge G3 is a temperature higher than the annealing point (for example, 550° C.). By this method, it is possible to produce a temperature difference of at least 8° C. more securely when the edge G3 reaches the annealing point.

The purpose of lifting up the glass sheet by the lift-up member is to produce a temperature difference of at least 8° C. between the edge G3 and the inside (10 mm) from the edge before the edge G3 reaches the strain point, by cooling the edge G3 by the lifting up in a case where the temperature difference between the edge G3 and the inside (10 mm) from the edge is less than 8° C. before the lifting up. Without lifting up the glass sheet, since the heat capacity of the forming mold 16 is large and the temperature of the forming mold 16 does not easily drop, cooling of the edge in contact with the forming mold 16 becomes slow, whereby the temperature difference between the edge G3 and the inside (10 mm) from the edge does not become at least 8° C.

Further, since the temperature of the atmosphere in the annealing zone is low, at the instant of entry of the glass sheet into the annealing zone, the temperature difference between the edge G3 and the inside (10 mm) from the edge tends to be produced, and the temperature difference between the edge G3 and the inside (10 mm) from the edge becomes already at least 8° C. before lifting up the glass sheet in some cases. In such cases, it is necessary to maintain the temperature difference between the edge G3 and the inside (10 mm) from the edge by the lifting up until the edge G3 reaches the strain point. Without lifting up, since the temperature of the forming mold does not easily drop, the temperature of the edge G3 in contact with the forming mold 16 also does not easily drop, whereby the temperature difference from the inside (10 mm) from the edge becomes small.

More preferably, the glass sheet G is annealed after it is heated to a temperature of at least the annealing point +32° C. (for example, 582° C.). By forming such a high-temperature state, it is possible to securely relax the stress.

As described above, in the annealing method of a glass sheet G of this embodiment, in the state that the heated and bent glass sheet G is placed on the forming mold 16, first, the cooling region G1 of the glass sheet G is cooled by the cooling devices 20, 22, to make only the cooling region G1 to be in a low-temperature state of at most the strain point. Next, in this state, the lift-up member 36 is operated to lift up the cooling region G1 of the glass sheet G by the rods 38, 38 . . . to separate the glass sheet G from the forming mold 16. By such an annealing method, it is possible to lift up the glass sheet G from the forming mold 16 without generating a strain in the glass sheet G.

Further, in this process, the glass sheet G is annealed under the temperature conditions of the edge G3 and the inside (10 mm) from the edge. By the above method, it is possible to make E/C in the peripheral region A1 to be from 10 MPa to 18 MPa, and to make the maximum value of I/T in the intermediate region A2 to be 2.4 MPa. Accordingly, it is possible to produce a glass sheet G having a good strength as a glass sheet for a laminated glass to be fit into a frame of an automobile in a flash-mount structure.

Here, in the embodiment, the described annealing point and strain point are those of soda lime glass as an example, but they are appropriately changed depending on the composition of glass. Further, in this embodiment, bending is carried out in a state that a single glass sheet G is placed on the ring-shaped forming mold 16 and heated, but the bending may be carried out by gravity in a state that two glass sheets are placed on a forming mold 16 as they are piled up and heated.

Conditions in the case of placing two glass sheets on the forming mold 16 in a state that they are piled up with each other and heating them to bend the glass sheets by gravity, may be selected in the same manner as the conditions in the above case of placing a single glass sheet G on the ring-shaped forming mold 16 and heating the glass sheet to bend the glass sheet.

Here, in a case of lifting up a region to be lifted up of two glass sheets placed on a forming mold in a state that they are piled up, by a lift-up member, it is necessary that the region to be lifted up of a glass sheet that contacts with the lift-up member, that is an underside glass sheet, is cooled to a temperature below the strain point before the edge of the glass sheet reaches the strain point, and thereafter, the glass sheets are lifted up by the lift-up member. Among the two placed glass sheets, the region of the upper glass sheet to be lifted up is also preferably cooled to a temperature below the strain point before the edge of the glass sheet reaches the strain point and before the lift-up member contacts with the region. However, the region of the upper glass sheet to be lifted up is not necessarily cooled to a temperature below the strain point before the edge of the glass sheet reaches the strain point and before the lift-up member contacts with the region.

Further, the state that the glass sheet G is separated from the forming mold 16 may be terminated when the temperature of the edge of the glass sheet G is at most the strain point −10° C., and the glass sheet is returned into the state that the edge of the glass sheet G is placed on the ring-shaped forming mold to continue the cooling.

Further, in this embodiment, the glass sheet G is placed on the forming mold 16 and heated to bend the glass sheet by gravity, but the glass sheet may be pressed to be bent by a press means after the glass sheet is heated and placed on the forming mold, and thereafter, the above annealing treatment may be carried out. In this case, the glass sheet press-molded by the press mold is thereafter transferred onto a ring-shaped forming mold, and is subjected to the annealing method of the present invention.

The process for producing a laminated glass of the present invention has a forming step of heating and softening a plurality (for example, two) of glass sheets, that are placed on a supporting mold (ring mold) for supporting the glass sheets from the underside, to bend the glass sheets into a predetermined shape; a lamination step of laminating the plurality (for example, two) of bent glass sheets via an interlayer; and a forming step of bonding the laminated glass sheets and the interlayer to form a laminated glass.

In the forming step, a plurality of flat-plate shaped glass sheets are bent to obtain a plurality of glass sheets having a predetermined shape. In the forming step, it is possible to place the glass sheets on a ring mold and heat and soften the glass sheets by a heating furnace, to bend the glass sheets into a predetermined shape by gravity. Further, glass sheets preformed by gravity may be sandwiched between a ring mold and a press mold and pressurize them to carry out main forming.

A plurality of the obtained glass sheets are sufficiently cooled, and cleaned as the case requires (for example, in order to remove releasing agent), and subjected to the lamination step.

In the lamination step, the plurality of bent glass sheets are laminated via an interlayer, evacuated and pressurized in e.g. a sealed rubber bag to obtain a glass laminate (non-bonded laminate). Thereafter, the glass laminate is put into an autoclave, heated and press-bonded in a press-bonding step to obtain a laminated glass 20 having a predetermined curved shape.

EXAMPLES

In a bending apparatus 14 shown in FIG. 2, two glass sheets each having a thickness of 2 mm were placed on a forming mold 16 in a state that they were piled up via a separating powder and that the edges of the glass sheets were supported by the forming mold 16, they were moved to pass through a heating furnace 12 to bend the glass sheets. Subsequently, the shaped glass sheets were conveyed into an annealing furnace 10, and as shown in FIG. 4, the cooling region of the glass sheet G was cooled by cooling devices 20, 22. Next, a lift-up member 36 was operated to lift up the cooling region G1 of the glass sheet G by the rods 38 shown in FIG. 5, to separate the glass sheet G from the forming mold 16 to cool the glass sheet G. By this method, the shaped glass sheets were annealed under four cooling conditions of Examples 1 to 3 and 6 shown in Table 1. The annealing point of the glass sheets was 550° C., their strain point was 510° C. Examples 1 to 3 are Examples of the present invention and Examples 4, 5 and 6 are Comparative examples. Example 4 is an example of annealing glass sheets without using the cooling devices 20, 22 and lifting up the glass sheets at a temperature higher than the strain point, Example 5 is an example of carrying out no lifting up, and Example 6 is an example not satisfying the condition that the temperature of the edge of the glass sheet is at least 3° C. lower than the temperature of a point 10 mm inside from the edge when the temperature of the edge is the annealing point +20° C. Conditions of Examples 4 and 5 are as shown in Table 1.

Temperature histories in these Examples are shown in FIGS. 6 to 15. In each of graphs shown in FIGS. 6, 8 10, 12, 14 and 16, the vertical axis represents the temperature histories at the edge G3 and the center (included in the cooling region G1) of the glass sheet, and the horizontal axis represents the lapse of temperature measurement time of the glass sheet (lapse of time from the start of heating of the glass sheet). Here, the timing of start of temperature measurement does not have a specific meaning, and the timings of these Examples do not agree with one another. Further, in each of the graphs shown in FIGS. 7, 9, 11, 13, 15 and 17, the vertical axis represents the temperature difference between the edge G3 of the glass sheet and the inside (10 mm inside from the edge), and the horizontal axis represents the lapse of time of temperature measurement of the glass sheet.

TABLE 1

|  |  | Annealing point + 20° C. | Lifting-up time | Strain point |
|---|---|---|---|---|
| Ex. 1 | Timing [sec] | 456-459 | 567 | 591 |
|  | Edge [° C.] | 570.0 | 542 | 510.0 |
|  | Inside from edge [° C.] | 574.5-576.0 | 545.5 | 520.5 |
|  | Temperature difference [° C.] | 4.5-6.0 | 3.5 | 10.5 |
| Ex. 2 | Timing [sec] | 475-476 | 543 | 555 |
|  | Edge [° C.] | 569.5-570.5 | 537.5 | 510.0 |
|  | Inside from edge [° C.] | 575.5-576.0 | 553.5 | 525.5 |
|  | Temperature difference [° C.] | 5.0-6.5 | 16.0 | 15.5 |
| Ex. 3 | Timing [sec] | 605-606 | 618 | 621-622 |
|  | Edge [° C.] | 567.0-571.5 | 518.5 | 511.0-509.0 |
|  | Inside from edge [° C.] | 572.5-575.5 | 542.5 | 535.5-533.5 |
|  | Temperature difference [° C.] | 4.0-5.5 | 24.0 | 24.5 |
| Ex. 4 | Timing [sec] | 344-345 | 356 | 371 |
|  | Edge [° C.] | 566.5-572.0 | 531.5 | 511.0 |
|  | Inside from edge [° C.] | 580.0-582.0 | 558.5 | 527.0 |
|  | Temperature difference [° C.] | 10.0-13.5 | 27.0 | 16.0 |
| Ex. 5 | Timing [sec] | 454-456 | — | 577 |
|  | Edge [° C.] | 570.0 | — | 510.0 |
|  | Inside from edge [° C.] | 575.0-575.5 | — | 516.0 |
|  | Temperature difference [° C.] | 5.0-5.5 | — | 6.0 |
| Ex. 6 | Timing [sec] | 548 | 618 | 626-627 |
|  | Edge [° C.] | 570.0 | 529.0 | 509.0-511.0 |
|  | Inside from edge [° C.] | 571.0 | 540.0 | 523.5-525.0 |
|  | Temperature difference [° C.] | 1.0 | 11.0 | 14.0-14.5 |

In Table 1, "annealing point+20° C." means that the edge temperature of a glass sheet is the annealing point +20° C., that is the condition of 570° C. in the Examples, and "lifting-up time" is a condition when the glass sheet was lifted up by the lift-up member. "Strain point" is a condition when the edge temperature of the glass sheet is the strain point, that is 510° C. in the Examples. "Timing" means a lapse of time after start of temperature measurement in each case, "edge" represents the temperature of the edge G3, "inside from edge" represents the temperature at 10 mm inside from the edge G3 (portion corresponding to line B). "Temperature difference" represents the temperature difference between "edge" and "inside from edge".

Further, Table 2 shows the results of generation of strain and stress distribution when the glass sheets were annealed under the above conditions. Here, with respect to Examples 2 and 5, FIG. 18 shows the stress distribution of plane stress from the edge of each glass sheet toward the inside. From FIG. 18, it is understandable that while I/T is small in each of Examples 2 of the present invention and Example 5 being a Comparative Example, E/C in Example 2 is larger than that of Example 5.

TABLE 2

|  | Center temperature at a time of lifting-up [° C.] | Generation of strain | E/C [MPa] | I/T [MPa] |
|---|---|---|---|---|
| Ex. 1 | 473 | No | 12.2 | 0.5 |
| Ex. 2 | 495 | No | 10.8 | 1.1 |
| Ex. 3 | 484.0 | No | 17.0 | 1.8 |
| Ex. 4 | 606.5 | Exist | 11.1 | 1.9 |
| Ex. 5 | — | No | 3.4 | 1.1 |
| Ex. 6 | 485.0 | No | 8.9 | 2.4 |

Figure 6:
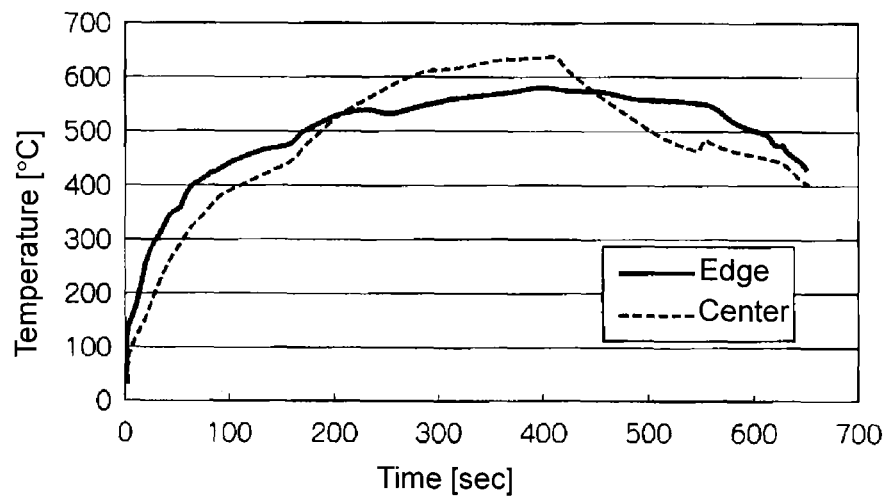
FIG. 6 is a graph of Example 1 showing the temperature histories of the edge of the glass sheet and a cooling region with respect to a lapse of temperature measurement time of the glass sheet.
Figure 7:
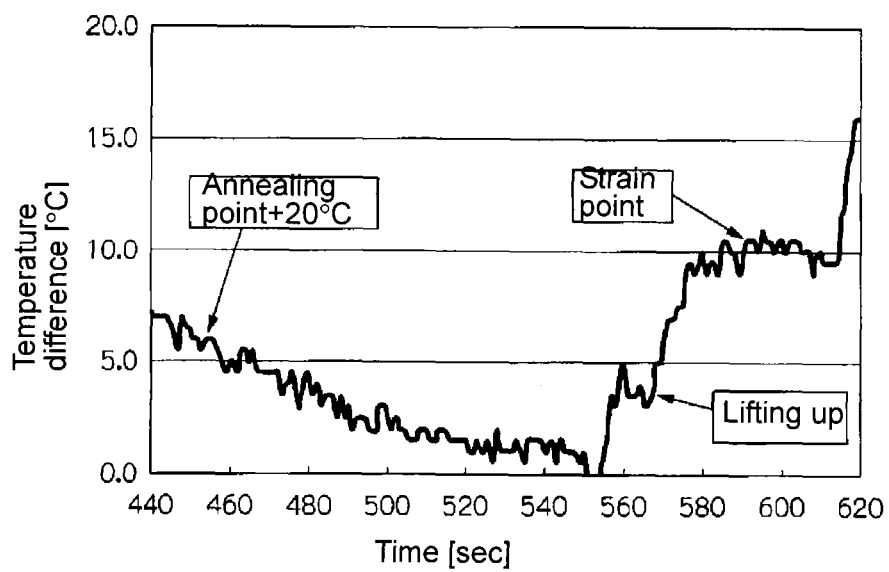
FIG. 7 is a graph of Example 1 showing the temperature difference between the edge of a glass sheet and a position 10 mm inside from the edge with respect to lapse of temperature measurement time of the glass sheet.
Figure 8:
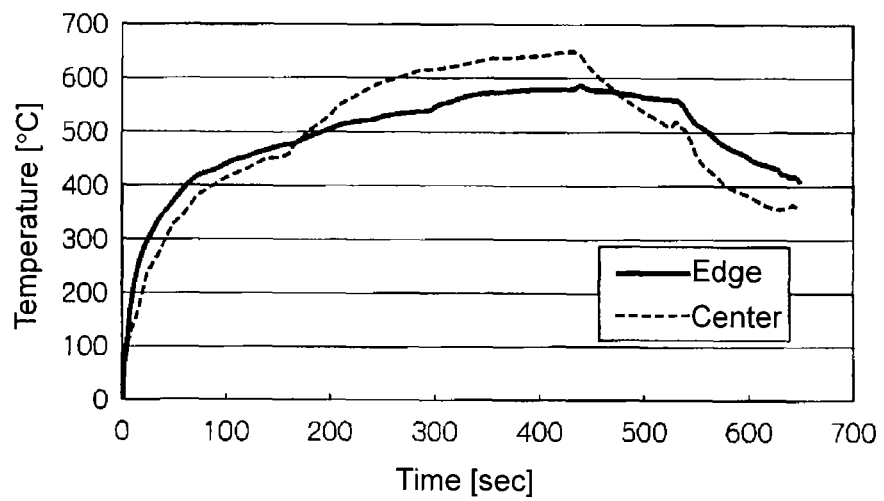
FIG. 8 is a graph of Example 2 showing the temperature histories of the edge of the glass sheet and a cooling region with respect to a lapse of temperature measurement time of the glass sheet.
Figure 9:
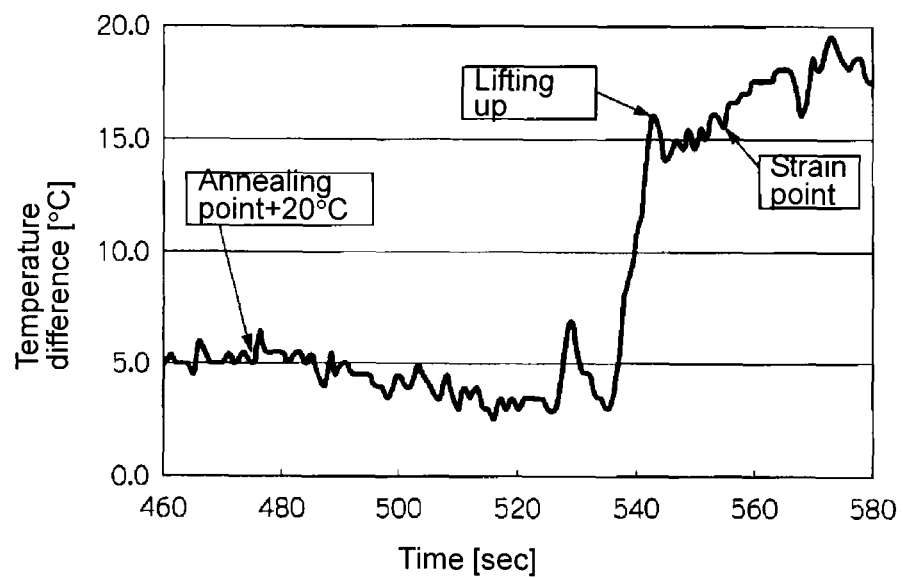
FIG. 9 is a graph of Example 2 showing the temperature difference between the edge of a glass sheet and a position 10 mm inside from the edge with respect to lapse of temperature measurement time of the glass sheet.
Figure 10:
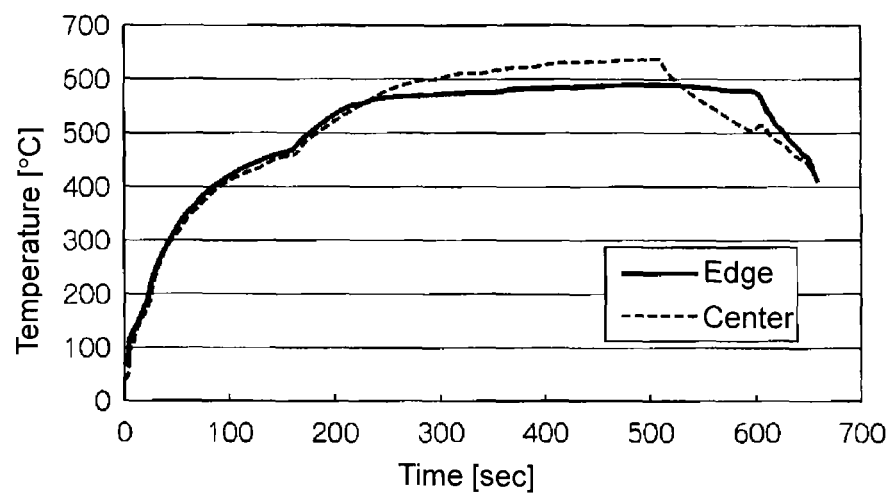
FIG. 10 is a graph of Example 3 showing the temperature histories of the edge of the glass sheet and a cooling region with respect to a lapse of temperature measurement time of the glass sheet.
Figure 11:
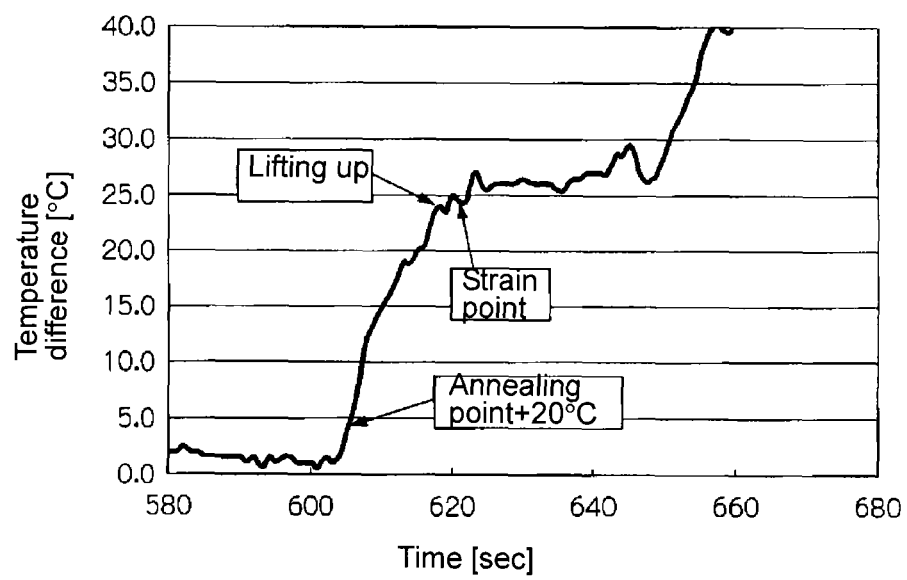
FIG. 11 is a graph of Example 3 showing the temperature difference between the edge of a glass sheet and a position 10 mm inside from the edge with respect to lapse of temperature measurement time of the glass sheet.
Figure 12:
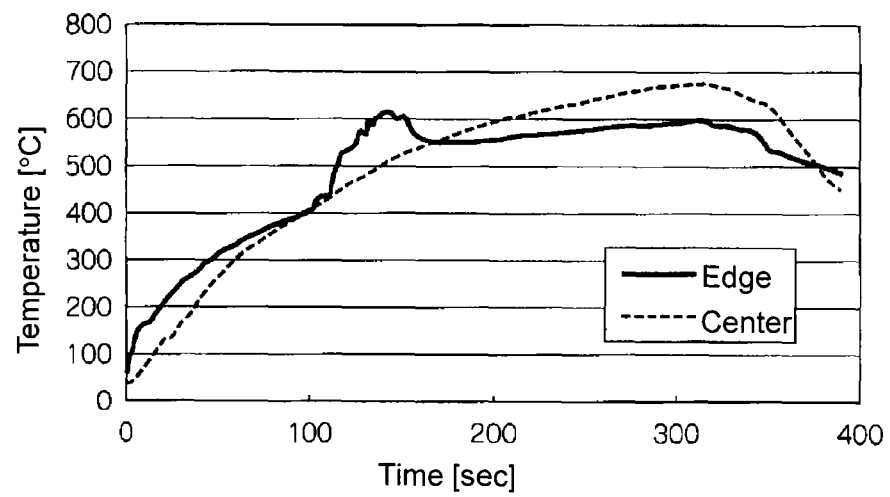
FIG. 12 is a graph of Example 4 showing the temperature histories of the edge of the glass sheet and a cooling region with respect to a lapse of temperature measurement time of the glass sheet.
Figure 13:
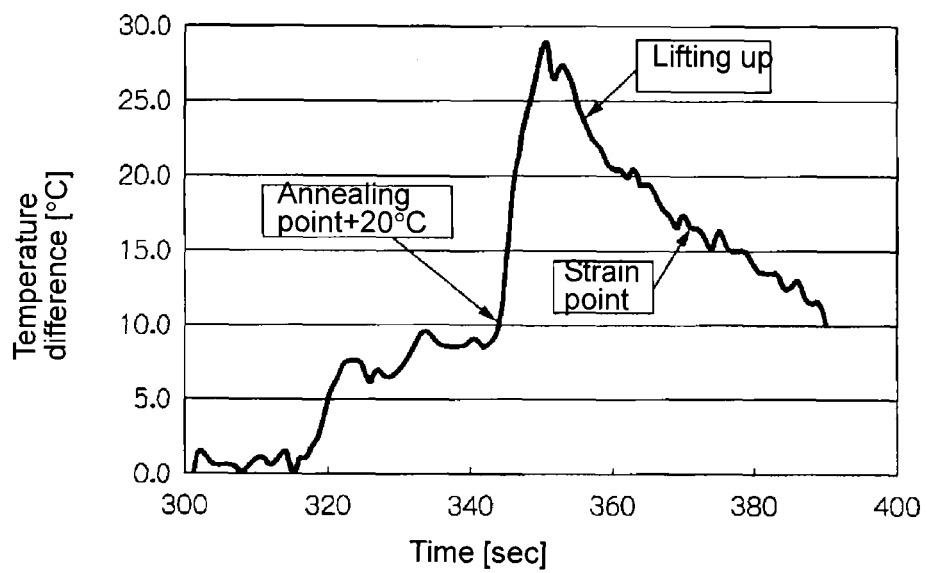
FIG. 13 is a graph of Example 4 showing the temperature difference between the edge of a glass sheet and a position 10 mm inside from the edge with respect to lapse of temperature measurement time of the glass sheet.

In each of FIGS. 6, 8 and 10, the temperatures of the edge G3 and the center were inverted by cooling produced by the cooling box 24 before the glass sheet was lifted up, and as shown in Table 2, the temperature of the center at a time of lifting up was below the strain point. On the other hand, in Example 4, since the cooling devices 22, 24 were not employed, the temperatures of the edge G3 and the center were not inverted at the time of lifting up as shown in FIG. 11. Further, since the temperature of the cooling region G1 was at least the strain point, a large strain was generated in the lifted-up portion.

Further, the stress distributions were as shown in Table 2. In Examples 1 to 3, E/C in the glass sheets was at least 10.0 MPa and at most 18.0 MPa, I/T was at most 2.4 MPa, and it was possible to form sufficient E/C in the glass sheet and to make I/T sufficiently small. On the other hand, in Example 5, since the glass sheet was not lifted up, it was not possible to produce a temperature difference of at least 8° C. between the edge G3 and the inside (10 mm) from the edge at the time of strain point, and accordingly, it was not possible to form a sufficient E/C. Further, in Example 6, since it was not possible to produce a temperature difference of at least 3° C. between the edge G and the inside (10 mm) from the edge at a time of the annealing point +20° C., and since relaxation of stress was thereby small, it was not possible to form a sufficient E/C.

Industrial Applicability

With the present invention, before a region of a high-temperature glass sheet bent and placed on a ring-shaped forming mold, is lifted up by a lift-up member to anneal the glass sheet, the region of the glass sheet to be lifted up is cooled to a temperature of at most the strain point, whereby strain is not generated in the portion in the lifted-up region of the glass sheet. Further, since the temperature condition in a region in the periphery of the edge of the glass sheet is controlled to be within a predetermined range, it is possible to make the value of plane tensile stress (that is I/T) small in the region right inside from the edge of the glass sheet, and it is possible to increase the value of plane compressive stress (that is E/C) formed in the edge of the glass sheet, and to obtain a glass sheet having a high edge strength. A glass sheet produced by the present invention is suitable as a component glass sheet to be employed for producing a laminated glass, and by employing such a component glass sheet to produce a laminated glass, it is possible to obtain a laminated glass having a high edge strength and a low I/T, and accordingly, such a glass is useful as a laminated glass for automobiles and other vehicles.

This application is a continuation of PCT Application No. PCT/JP2011/052174, filed Feb. 2, 2011, which is based upon and claims the benefit of priority from Japanese Patent Application No. 2010-022121 filed on Feb. 3, 2010. The contents of those applications are incorporated herein by reference in its entirety.

REFERENCE SYMBOLS

10 . . . annealing furnace, 12 . . . heating furnace, 14 . . . apparatus for producing glass sheet for laminated glass, 16 . . . forming mold, 18 . . . moving table, 20 . . . cooling device, 22 . . . cooling device, 24 . . . cooling box, 26 . . . blower, 28 . . . partition plate, 30 . . . ventilation flue, 32 . . . entrance, 34 . . . exit, 36 . . . lift-up member, 38 . . . rod, 40 . . . cylinder mechanism, 42 . . . cushion member, 44 . . . cylinder, 46 . . . piston, 48 . . . frame

What is claimed is:

1. A glass sheet which comprises a peripheral region having a certain width along the periphery of the glass sheet, and having an edge compression formed; an intermediate region adjacent to the inner peripheral side of the peripheral region, having a certain width, and having an inner tension formed; and a central region occupying the inner peripheral side of the intermediate region, and having a plane stress of zero on the border with the intermediate region;

wherein the maximum value of the edge compression in the peripheral region is at least 10 MPa and at most 18 MPa, and the maximum value of the inner tension in the intermediate region is at most 2.4 MPa.

2. The glass sheet according to claim 1, wherein the intermediate region is formed in a region of less than 60 mm from the edge of the glass sheet.

3. The glass sheet according to claim 1, wherein the maximum value of the inner tension is at most 1.8 MPa.

4. A laminated glass comprising at least two glass sheets bonded via an interlayer, wherein at least one of the glass sheets is the glass sheet as defined in claim 1.

5. A glass sheet which comprises a peripheral region having a certain width along the periphery of the glass sheet, and having an edge compression formed; an intermediate region adjacent to the inner peripheral side of the peripheral region, having a certain width, and having an inner tension formed; and a central region occupying the inner peripheral side of the intermediate region, and having a plane stress of substantially zero on the border with the intermediate region;

wherein the maximum value of the edge compression in the peripheral region is at least 10 MPa and at most 18 MPa, and the maximum value of the inner tension in the intermediate region is at most 2.4 MPa.

6. The glass sheet according to claim 5, wherein the intermediate region is formed in a region of less than 60 mm from the edge of the glass sheet.

7. The glass sheet according to claim 5, wherein the maximum value of the inner tension is at most 1.8 MPa.

8. A laminated glass comprising at least two glass sheets bonded via an interlayer, wherein at least one of the glass sheets is the glass sheet as defined in claim 5.

9. A process for producing the glass sheet of claim 1, which comprises a heating-forming step of heating and bending a glass sheet, and an annealing step of lifting up the glass sheet in a high-temperature state of at least the strain point placed on a ring-shaped forming mold, by a lift-up member to separate the glass sheet from the forming mold and annealing the glass sheet;

wherein the annealing step comprises, before lifting up the glass sheet, cooling a region of the glass sheet at least 50 mm inside from the edge of the glass sheet including at least the position that contacts with the lift-up member at the time of lifting up the glass sheet, to a temperature of at most the strain point before the edge of the glass sheet reaches the strain point;

forming a state that when the temperature of the edge is the annealing point +20° C., the temperature of the edge is at least 3° C. lower than the temperature of a point 10 mm inside from the edge; and forming a state that when the temperature of the edge is the strain point, the temperature of the edge is at least 8° C. lower than the temperature of the point 10 mm inside from the edge.

10. The process for producing a glass sheet according to claim 9, wherein the annealing step forms a state that the temperature of the edge is at least 8° C. lower than the temperature of a point 10 mm inside from the edge when the temperature of the edge is the annealing point.

11. The process for producing a glass sheet according to claim 9, wherein in the annealing step, the glass sheet G is lifted up by the lift-up member when the temperature of the edge is higher than the strain point −10° C.

12. The process for producing a glass sheet according to claim 9, wherein in the annealing step, the glass sheet G is lifted up by the lift-up member when the temperature of the edge is higher than the annealing point.

13. The process for producing a glass sheet according to claim 9, wherein in the heating-forming step, the glass sheet is heated to a temperature at least the annealing point +32° C.

14. A process for producing a laminated glass employing at least one glass sheet produced by the process for producing the glass sheet as defined in claim 9, and bonding at least two glass sheets via an interlayer.

15. A process for producing the glass sheet of claim 5, which comprises a heating-forming step of heating and bending a glass sheet, and an annealing step of annealing the glass sheet in a high-temperature state of at least the strain point placed on a ring-shaped forming mold;

wherein the annealing step comprises lifting up the glass sheet by a lift-up member to separate the glass sheet from the forming mold; and before the lifting up the glass sheet, cooling a region of the glass sheet at least 50 mm inside from the edge of the glass sheet including at least the position that contacts with the lift-up member at the time of lifting up the glass sheet, to a temperature of at most the strain point before the edge of the glass sheet reaches the strain point;

forming a state that when the temperature of the edge is the annealing point +20° C., the temperature of the edge is at least 3° C. lower than the temperature of a point 10 mm inside from the edge; and forming a state that when the temperature of the edge is the strain point, the temperature of the edge is at least 8° C. lower than the temperature of the point 10 mm inside from the edge.

16. The process for producing a glass sheet according to claim 15, wherein the annealing step forms a state that the temperature of the edge is at least 8° C. lower than the temperature of a point 10 mm inside from the edge when the temperature of the edge is the annealing point.

17. The process for producing a glass sheet according to claim 15, wherein in the annealing step, the glass sheet G is lifted up by the lift-up member when the temperature of the edge is higher than the strain point −10° C.

18. The process for producing a glass sheet according to claim 15, wherein in the annealing step, the glass sheet G is lifted up by the lift-up member when the temperature of the edge is higher than the annealing point.

19. The process for producing a glass sheet according to claim 15, wherein in the heating-forming step, the glass sheet is heated to a temperature at least the annealing point +32° C.

20. A process for producing a laminated glass employing at least one glass sheet produced by the process for producing the glass sheet as defined in claim 15, and bonding at least two glass sheets via an interlayer.

* * * * *